US010476127B2

(12) United States Patent
Kim et al.

(10) Patent No.: US 10,476,127 B2
(45) Date of Patent: Nov. 12, 2019

(54) MULTI-BAND ANTENNA APPARATUS

(71) Applicant: KMW INC., Hwaseong, Gyeonggi-Do (KR)

(72) Inventors: In-Ho Kim, Gyeonggi-do (KR); Hyoung-Seok Yang, Gyeonggi-do (KR); Chang-Woo Yoo, Gyeonggi-do (KR); Young-Chan Moon, Gyeonggi-do (KR); Seong-Man Kang, Gyeonggi-do (KR)

(73) Assignee: KMW INC., Hwaseong, Gyeonggi-do (KR)

( * ) Notice: Subject to any disclaimer, the term of this patent is extended or adjusted under 35 U.S.C. 154(b) by 202 days.

(21) Appl. No.: 15/245,758

(22) Filed: Aug. 24, 2016

(65) Prior Publication Data

US 2016/0365618 A1    Dec. 15, 2016

Related U.S. Application Data

(63) Continuation of application No. PCT/KR2015/001488, filed on Feb. 13, 2015.

(30) Foreign Application Priority Data

Feb. 24, 2014   (KR) .................. 10-2014-0021471

(51) Int. Cl.
*H01Q 1/12* (2006.01)
*H01Q 1/24* (2006.01)
(Continued)

(52) U.S. Cl.
CPC ......... *H01Q 1/1228* (2013.01); *H01Q 1/1207* (2013.01); *H01Q 1/1221* (2013.01);
(Continued)

(58) Field of Classification Search
CPC .................................................. H01Q 1/1228
See application file for complete search history.

(56) References Cited

U.S. PATENT DOCUMENTS

| 6,061,229 A | 5/2000 | Gates et al. | |
|---|---|---|---|
| 7,009,847 B1 * | 3/2006 | Wu .................. | H01R 13/60 174/50.52 |

(Continued)

FOREIGN PATENT DOCUMENTS

| CN | 201247823 Y | 5/2009 |
|---|---|---|
| CN | 201466222 U | 5/2010 |

(Continued)

OTHER PUBLICATIONS

European Search Report dated Oct. 9, 2017 in corresponding application EP 15 75 1898.6.

*Primary Examiner* — Jessica Han
*Assistant Examiner* — Amal Patel
(74) *Attorney, Agent, or Firm* — Mintz Levin Cohn Ferris Glovsky and Popeo, P.C.; Kongsik Kim; Jhongwoo Jay Peck

(57) ABSTRACT

A multi-band antenna apparatus according to one of various embodiments of the present invention may comprise: an antenna housing in which an antenna module having two or more frequency bands is mounted; a plurality of repeaters detachably coupled to the antenna housing according to slide movement thereof; connector parts which protrude from the antenna housing and are connected to the plurality of repeaters, respectively; and a bracket which fixes the antenna housing to an outer wall and couples the plurality of repeaters to the antenna housing in an individually detachable manner.

10 Claims, 15 Drawing Sheets

(51) Int. Cl.
*H01Q 1/42* (2006.01)
*H01Q 5/20* (2015.01)
*H04W 88/08* (2009.01)

(52) U.S. Cl.
CPC .......... *H01Q 1/1242* (2013.01); *H01Q 1/246* (2013.01); *H01Q 1/42* (2013.01); *H01Q 5/20* (2015.01); *H04W 88/085* (2013.01)

(56) References Cited

U.S. PATENT DOCUMENTS

| | | | |
|---|---|---|---|
| 9,172,421 B2 * | 10/2015 | Colapietro | H04B 1/40 |
| 9,287,613 B2 * | 3/2016 | Colapietro | H01Q 1/02 |
| 2009/0207094 A1 | 8/2009 | Yang et al. | |
| 2012/0206885 A1 | 8/2012 | Pan et al. | |
| 2014/0179244 A1 | 6/2014 | Colapietro et al. | |
| 2015/0115117 A1 | 4/2015 | Mummert et al. | |

FOREIGN PATENT DOCUMENTS

| | | |
|---|---|---|
| CN | 201528038 U | 7/2010 |
| JP | 2000165121 A | 6/2000 |
| JP | 2007019881 A | 1/2007 |
| JP | 2013507854 A | 3/2013 |
| KR | 10-0687477 B1 | 3/2007 |
| KR | 10-2008-0005786 A | 1/2008 |
| KR | 10-0947473 B1 | 3/2010 |
| KR | 20-0451567 Y1 | 12/2010 |
| WO | WO-2013185925 A1 | 12/2013 |

* cited by examiner

MULTI-BAND ANTENNA APPARATUS

CROSS REFERENCE TO RELATED APPLICATIONS

This application is a continuation of an International Application No. PCT/KR2015/001488 filed on Feb. 13, 2015, which claims priority to Korean Patent Application No. 10-2014-0021471 filed on Feb. 24, 2014, the entire disclosures of which are incorporated herein by reference.

TECHNICAL FIELD

The present invention relates to an antenna apparatus, and particularly, to a multi-band antenna apparatus having a plurality of radio remote heads (RRHs) and enabling an antenna to connect with a RRH.

BACKGROUND ART

As wireless mobile communication services are commonplace, antenna apparatuses are spreading, which may offer services in a more stabilized manner. In particular, wireless mobile communication services, which had been provided via 2nd generation (2G) and 3G allowing only for voice calls, now adopt 4G mobile communication techniques based on long term evolution (LTE) enabling communication of various data signals. Antenna apparatuses for such 4G mobile communication and legacy antenna apparatuses are installed in a limited space. That is, 700 MHz, 850 MHz, PCS, and advanced wireless service (AWS) band antennas and their respective corresponding radio remote heads ('RRH") are installed in a single limited space.

Antenna apparatuses with such structure end up with the result that at least four antennas, as well as their respective corresponding RRHs are installed in a limited space. This leads to spatial limitations and increased costs. Further, recommended sizes of antennas in an antenna apparatus are 4 ft, 6 ft, or 8 ft, and in case multiple antennas are equipped in one antenna housing, the RRHs respectively corresponding to the antenna frequencies suffer from an insufficient installation space.

Further, equipping multiple antennas in one antenna housing results in an insufficient space for placing the RRHs adjacent to the antenna housing.

In case a plurality of antennas are mounted in a single housing and a plurality of RRHs are placed in one RRH housing, the antennas corresponding to the RRHs in the RRH housing, as well as the corresponding frequency antennas might be not used upon exchanging RRHs.

SUMMARY

Thus, according to an embodiment of the present invention, there is provided a multi-band antenna apparatus allowing multiple antennas to be equipped in a single housing.

Further, there is provided a multi-band antenna apparatus that may equip at least two or more RRHs respectively corresponding to frequencies in an antenna housing with a plurality of antennas, is provided to separately each RRH, and enables simple exchange of the RRHs.

To the end, according to an embodiment of the present invention, a multi-band antenna apparatus may comprise an antenna housing mounting antenna modules with two or more frequency bands, a plurality of relays detachably coupled to the antenna housing as the relays slide, connector portions respectively connected with the plurality of relays and protruding from the antenna housing, and brackets fastening the antenna housing to an outer wall and individually and detachably coupling the plurality of relays to the antenna housing.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Figure 1:
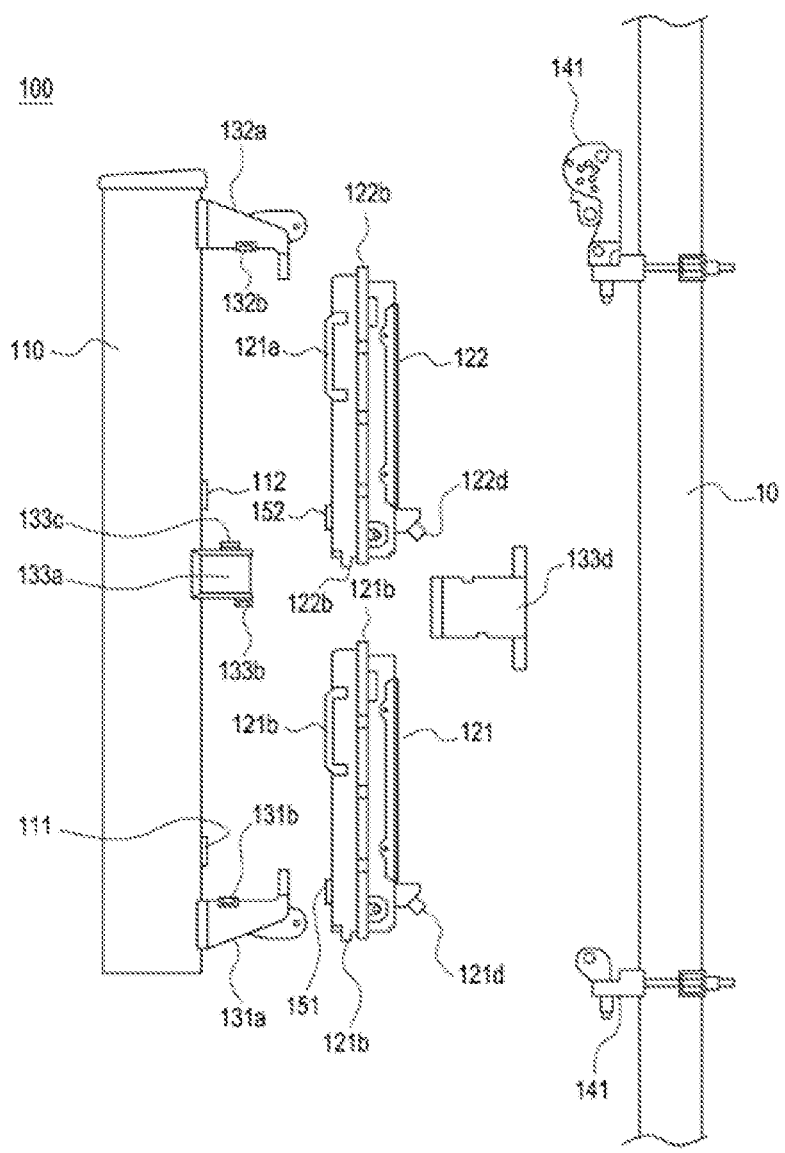
FIG. 1 is an exploded side view illustrating a multi-band antenna apparatus according to an embodiment of the present invention.

Various changes may be made to the present invention, and the present invention may come with a diversity of embodiments. Some embodiments of the present invention are shown and described in connection with the drawings. However, it should be appreciated that the present invention is not limited to the embodiments, and all changes and/or equivalents or replacements thereto also belong to the scope of the present invention.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present invention. The term "and/or" may denote a combination(s) of a plurality of related items as listed or any of the items.

The terms "front," "rear surface," "upper surface," and "lower surface" are relative ones that may be varied depending on directions in which the figures are viewed, and may be replaced with ordinal numbers such as "first" and "second." The order denoted by the ordinal numbers, first and second, may be varied as necessary.

The terms as used herein are provided merely to describe some embodiments thereof, but not to limit the present invention. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present invention belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For description purposes, a multi-band antenna apparatus according to an embodiment of the present invention has multi-band antennas having at least two or more frequency bands to cover such two or more frequency bands in one antenna housing. Specifically, there is disclosed a multi-band antenna apparatus where antennas with legacy PCS, 2G mobile communication service, 3G, and 4G mobile communication service bands, from a frequency band perspective, 700 MHz, 850 MHz, PCS, or advanced wireless service (AWS) band antennas, are equipped in one housing.

Further, there is provided a multi-band antenna apparatus where, among four RRHs respectively connected with the frequency band antennas to receive their respective antenna signals and signals from a base station, specifically, a RRH for 700 MHz (hereinafter, "first RRH"), a RRH for AWS (hereinafter, "second RRH"), a RRH for 850 MHz (hereinafter, "third RRH"), and a RRH for PCS (hereinafter, "fourth RRH"), at least two or more RRHs are provided to be formed in the antenna housing as a single body and they are individually attached or detached from the antenna housing.

Further, a multi-band antenna apparatus is disclosed where when a plurality of RRHs mounted in an antenna housing as a single body, they may be connected with their respective corresponding antennas.

Further, there is disclosed an antenna apparatus having a plurality of RRHs in an antenna housing as a single body and enabling RRHs to be separately attached or detached from the antenna housing for replacing or repairing each RRH so that antennas except for the antennas connected with replaced RRHs may be put in continuous use and service.

Figure 14:
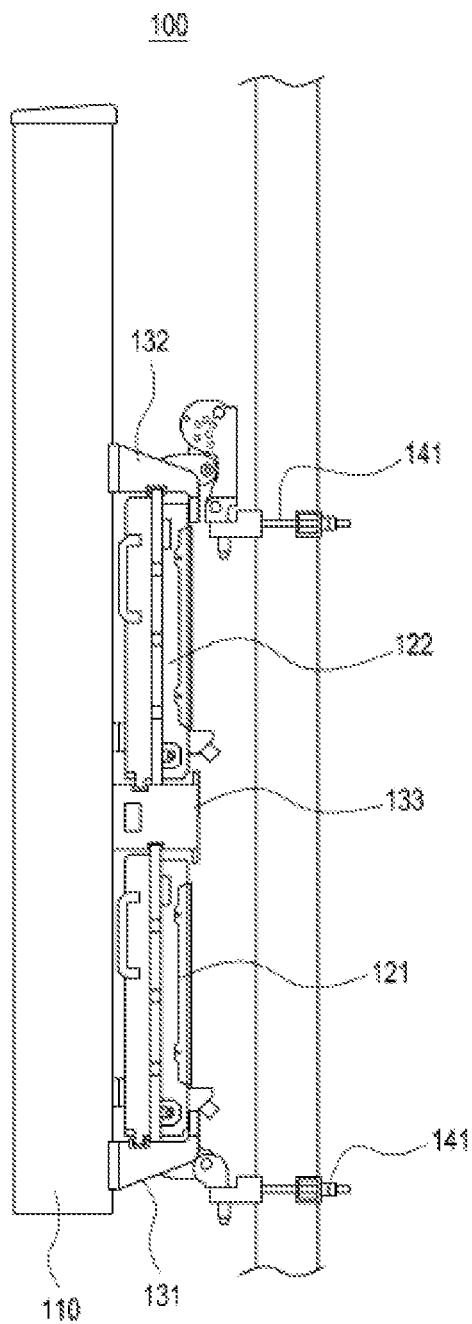
FIG. 14 is a view illustrating an example in which an antenna housing is sized to be 7 ft in a multi-band antenna apparatus according to an embodiment of the present invention.
Figure 15:
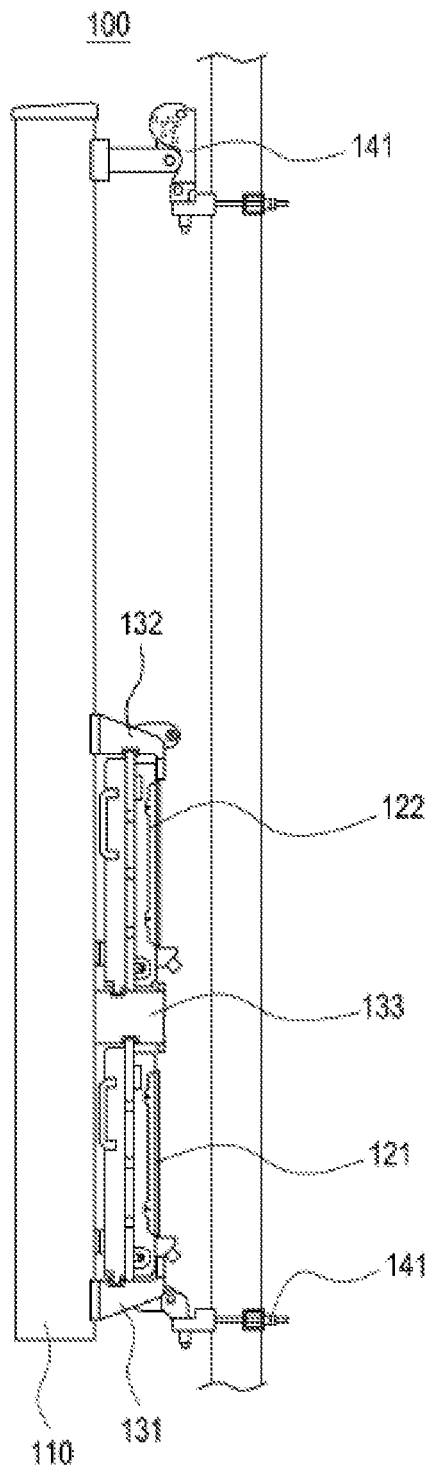
FIG. 15 is a view illustrating an example in which an antenna housing is sized to be 9 ft in a multi-band antenna apparatus according to an embodiment of the present invention.

Further, according to an embodiment of the present invention, there is disclosed a multi-band antenna apparatus having at least one size of 4 ft, 7 ft, and 9 ft and enabling two RRHs formed as a single body in an antenna housing providing a plurality of antenna modules (refer to FIGS. 14 and 15).

Further, according to an embodiment of the present invention, there is disclosed a multi-band antenna apparatus where when an RRH is mounted on a surface of an antenna housing, an antenna module and the RRH connected with the antenna module may make an electrical connection.

Figure 2:
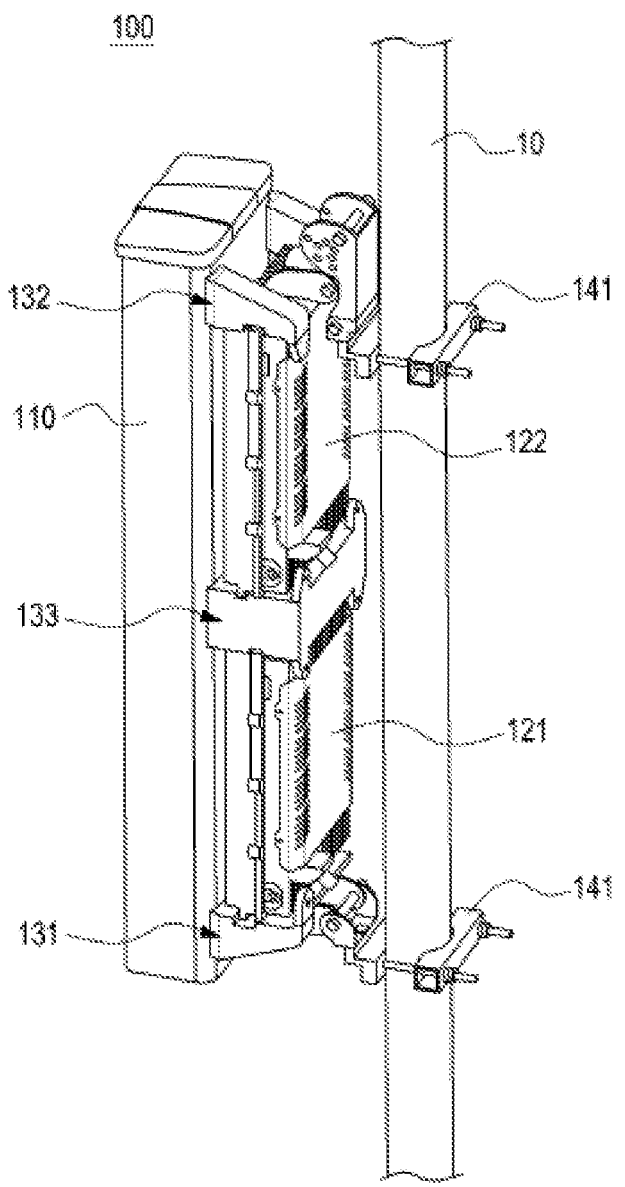
FIG. 2 is an assembled perspective view illustrating a multi-band antenna apparatus according to an embodiment of the present invention.

FIG. 1 is an exploded side view illustrating a multi-band antenna apparatus according to an embodiment of the present invention. FIG. 2 is an assembled perspective view illustrating a multi-band antenna apparatus according to an embodiment of the present invention.

Referring to FIGS. 1 and 2, according to an embodiment of the present invention, the multi-band antenna apparatus 100 includes an antenna housing 110 where antenna modules (not shown) having at least two or more frequency bands are mounted, a plurality of relays formed as a single body in the antenna housing 110 and individually and detachably coupled to the antenna housing 110, and brackets 131, 132, 133, and 141 individually and detachably coupling the plurality of relays to the antenna housing 110. Particularly in the instant embodiment, the antenna modules mounted in the antenna housing 110 are, e.g., multi-band antennas of an antenna module covering a legacy 850 MHz band, an antenna module covering a PCS band (the antenna module for 850 MHz and the antenna module for PCS are collectively referred to as "third antenna modules" (not shown)), as well as an antenna module covering a 700 MHz band (hereinafter, a "first antenna module" (not shown)), and an antenna module covering an advanced wireless service (AWS) band (hereinafter, a "second antenna module" (not shown)) for description purposes. That is, the antenna modules are multi-band antennas that may cover at least two frequency bands including antenna modules with bands recently offered, as well as antenna modules with existing service bands. As set forth above, the first antenna module, the second antenna module, and the third antenna modules all are together provided in one antenna housing 110. The relays are devices that are respectively connected with the antenna modules with frequency bands provided in the antenna housing 110 to perform communication with the antennas and a base station. Specifically, the relays are devices that receive signals weakened between a base station in a communication system and a mobile communication terminal, amplify, or re-transmit the signals, or normalize distorted waveforms, adjust the timing or reconfigure, and transmit the signals. According to this embodiment, the relays include a first relay connected with the first antenna module, a second relay connected with the second antenna module, and third relays (not shown) connected with the third antenna modules, where the third relays may be divided into a relay connected with the antenna module for 850 MHz and a relay connected with the PCS antenna module. Although not shown, the third relays (hereinafter, "third radio remote heads (RRHs)") connected with the third antenna modules are installed on, e.g., outer walls 10 separately from the antenna housing 110 and are electrically connected with the first antenna module through cables. According to an embodiment of the present invention, the first relay 121 (hereinafter, a "first RRH") connected with the first antenna module and the second relay 122 (hereinafter, a "second RRH") connected with the second antenna module are provided to be formable on a surface of the antenna housing as a single body 133a (which may be referred to as a single-body type). However, the first RRH 121 and the second RRH 122 may be mounted to neighbor each other on a surface of the antenna housing 110 so that they may be individually and detachably coupled.

Figure 3:
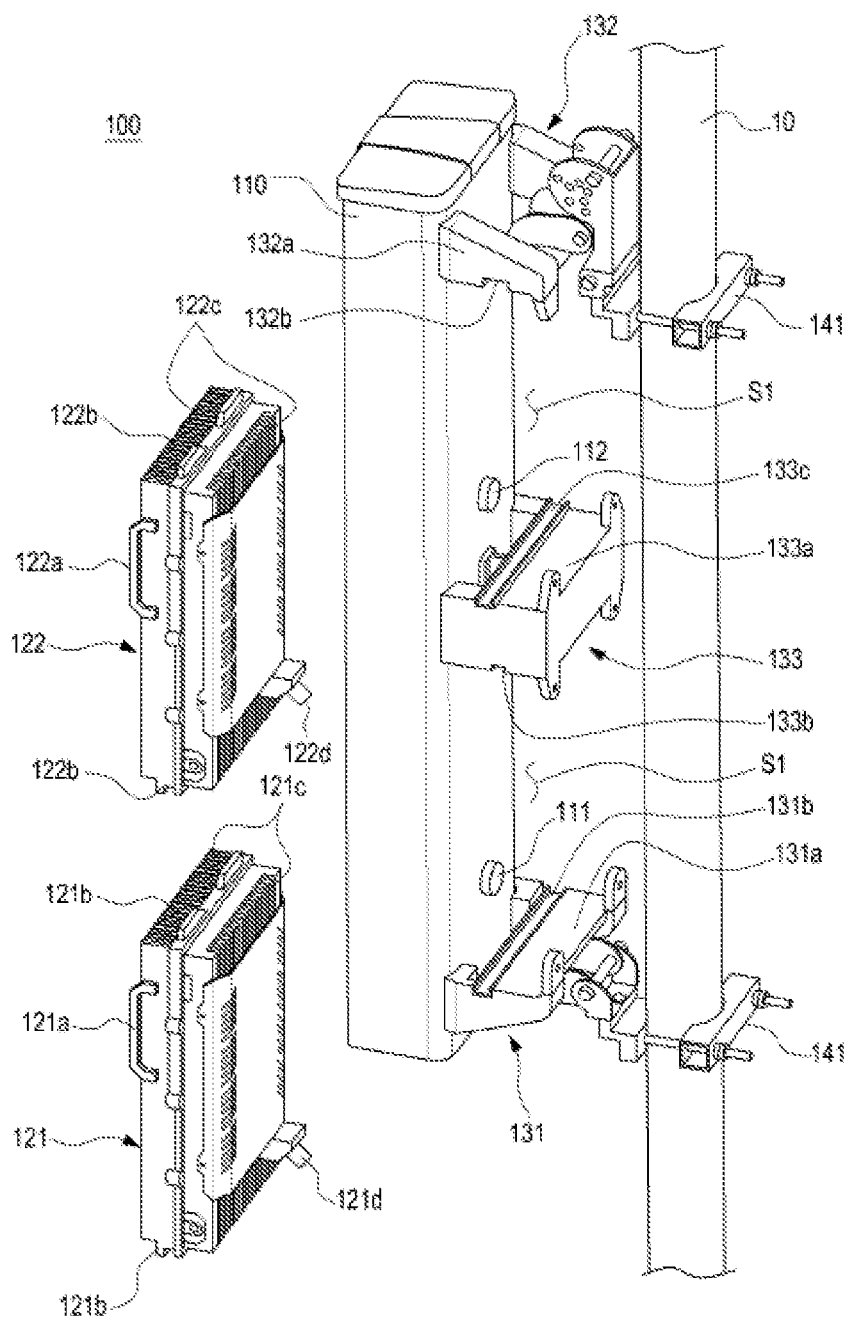
FIG. 3 is a perspective view illustrating a multi-band antenna apparatus as viewed in a different direction, wherein a first RRH and a second RRH are separated, according to an embodiment of the present invention.
Figure 4:
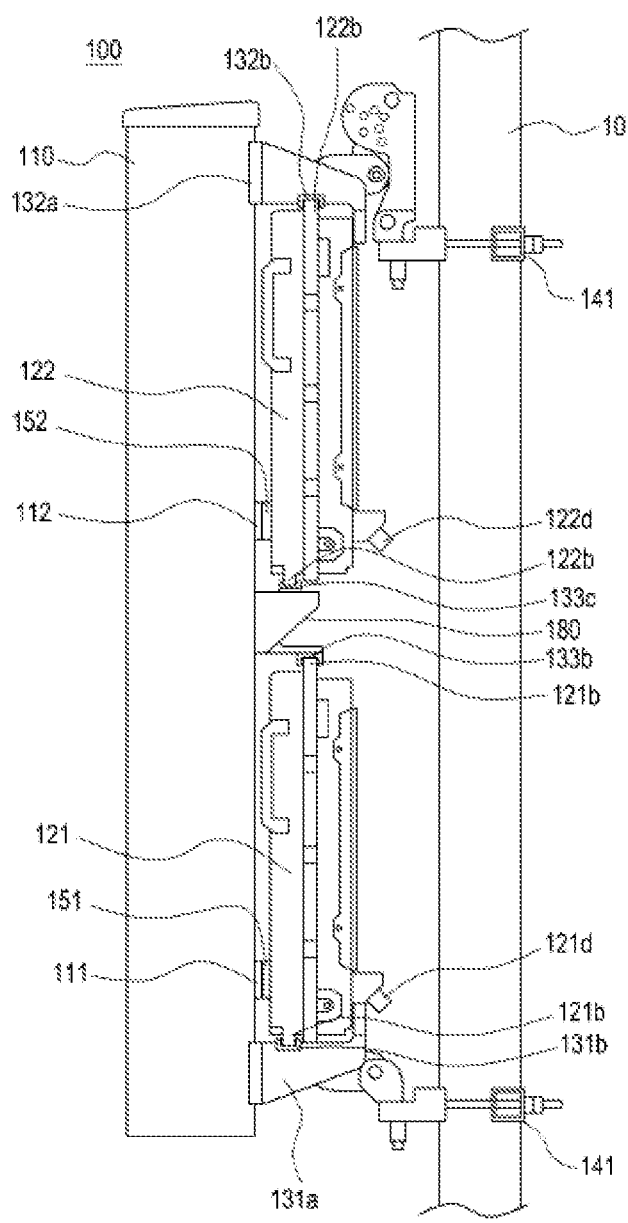
FIG. 4 is an assembled side view illustrating a multi-band antenna apparatus according to an embodiment of the present invention.

FIG. 3 is a perspective view illustrating a multi-band antenna apparatus as viewed in a different direction, wherein a first RRH and a second RRH are separated, according to an embodiment of the present invention. FIG. 4 is an assembled side view illustrating a multi-band antenna apparatus according to an embodiment of the present invention.

Referring to FIGS. 3 and 4, as many connector portions as the number of RRHs mounted on one surface (which corresponds to a "rear surface" in this embodiment and is hereinafter referred to as the rear surface) of the antenna housing 110 protrude from the rear surface of the antenna housing 110. That is, the connector portions are provided to protrude from the rear surface of the antenna housing 110 to electrically connect a plurality of RRHs 121 and 122 provided as a single body in the antenna housing 110 to their respective antenna modules provided in the antenna housing 110. Specifically, according to an embodiment of the present invention, the connector portions may include a first connector 111 and a second connector 112.

The first connector 111 is positioned at a lower side of the rear surface of the antenna housing 110 and is provided to vertically protrude on the rear surface of the antenna housing 110. Further, the first connector 111 is a component that electrically connects the first RRH 121 with the first antenna module provided in the antenna housing 110. The first connector 111 is provided to be movable in the vertical direction at a predetermined distance from the rear surface of the antenna housing 110. Thus, if the first RRH 121 is connected to the rear surface of the antenna housing 110, the first connector 111 may be driven in at least one way of automatically, semi-automatically, or manually. For example, a snap on-type connector may be provided to enable a one-touch connection or disconnection. As the first connector 111 vertically moves in the protruding direction from the rear surface of the antenna housing 110, it may be electrically connected with the first RRH 121, specifically, a first connector terminal 151 positioned on the front surface of the first RRH 121.

The second connector 112 is positioned on the rear surface of the antenna housing 110, spaced apart at a predetermined interval from an upper side of the first connector 111, and provided to vertically protrude from the rear surface of the antenna housing 110. Further, the second connector 112 is a component that electrically connects the second RRH 122 with the second antenna module provided in the antenna housing 110. The second connector 112 is provided to be movable in the vertical direction at a predetermined distance from the rear surface of the antenna housing 110. Thus, if the second RRH 122 is coupled to the rear surface of the antenna housing 110, the second connector 112 may be driven in at least one way of automatically, semi-automatically, or manually to vertically move in the protruding direction from the rear surface of the antenna housing 110. For example, a snap on-type connector portion may be provided to enable a one-touch connection or disconnection. As the second connector 112 vertically moves in the protruding direction from the rear surface of the antenna housing 110, it may be electrically connected with the second RRH 122, specifically, a second connector terminal 152 positioned on the front surface of the second RRH 122.

Described infra is an example in which the first RRH 121 and the second RRH 122 are mounted adjacent to each other in the direction of gravity on the rear surface of the antenna housing 110 according to an embodiment of the present invention. Thus, the first connector 111 and the second connector 112 electrically connected with the first RRH 121 and the second RRH 122 arranged in the gravity direction on the rear surface of the antenna housing 110 may be positioned adjacent to each other in the gravity direction.

As described above, the first connector 111 and the second connector 112 may be formed to protrude at a predetermined distance not interfering with a slide of the first RRH 121 and the second RRH 122 in a direction parallel with the rear surface of the antenna housing 110. Further, the first connector 111 and the second connector 112 are driven in at least one way of automatically, semi-automatically, or manually along the protruding direction from the rear surface of the antenna housing 110. Thus, if the first RRH 121 and the second RRH 122 are mounted on the rear surface of the antenna housing 110, the first connector 111 may be electrically connected with the first connector terminal 151, and the second connector 112 may be electrically connected with the second connector terminal 152.

Figure 5:
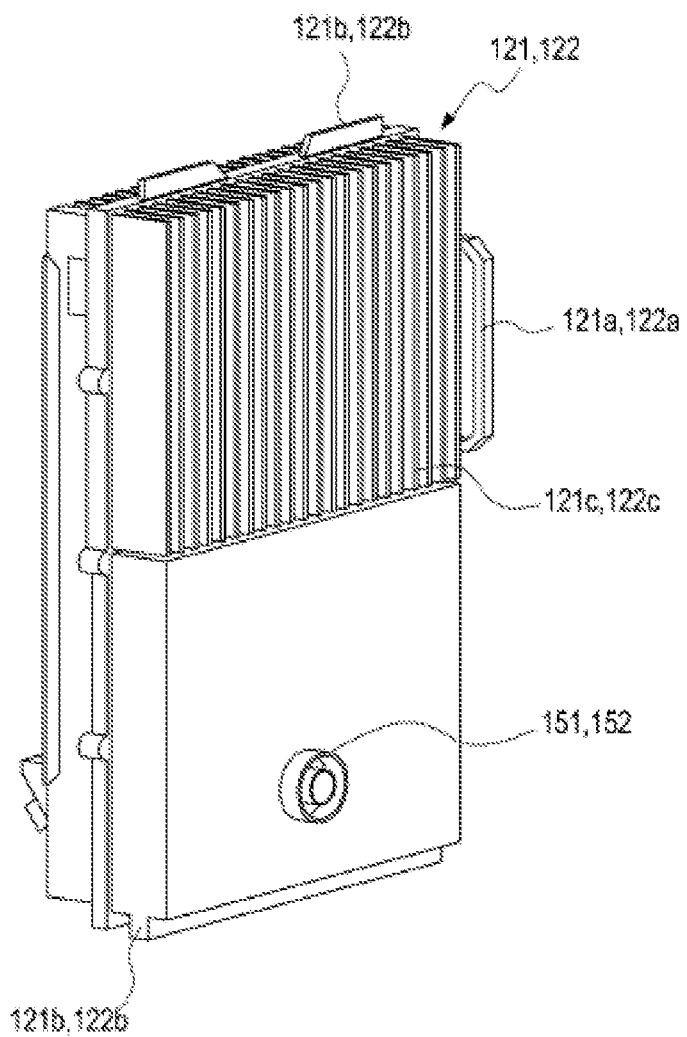
FIG. 5 is a perspective view illustrating a multi-band antenna apparatus, wherein a front surface of a first RRH or a second RRH is shown, according to an embodiment of the present invention.
Figure 6:
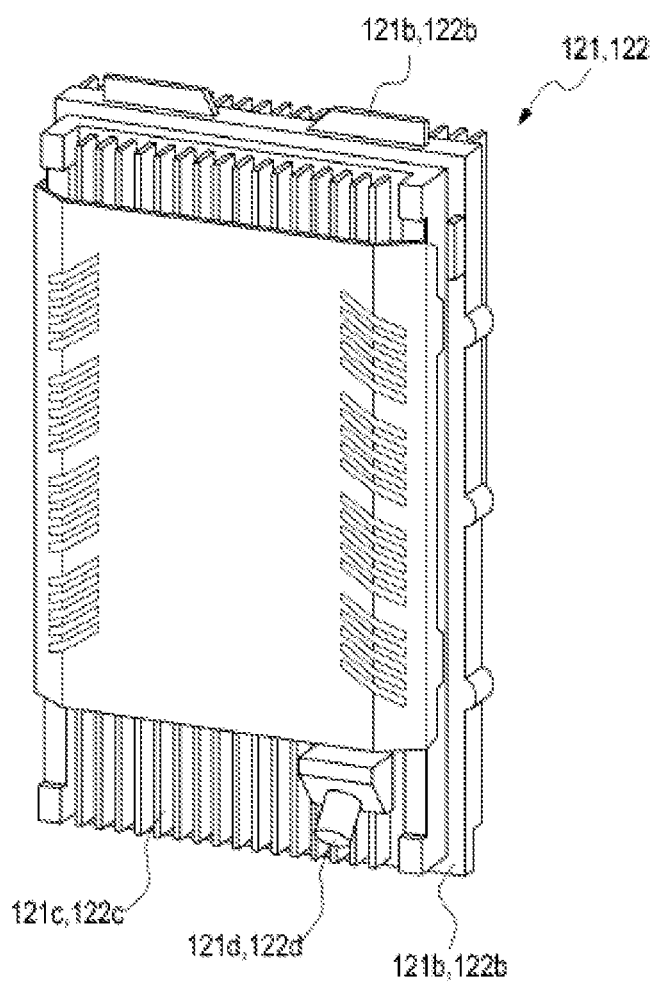
FIG. 6 is a perspective view illustrating a multi-band antenna apparatus, wherein a rear surface of a first RRH or a second RRH is shown, according to an embodiment of the present invention.

FIG. 5 is a perspective view illustrating a multi-band antenna apparatus, wherein a front surface of a first RRH or a second RRH is shown, according to an embodiment of the present invention. FIG. 6 is a perspective view illustrating a multi-band antenna apparatus, wherein a rear surface of a first RRH or a second RRH is shown, according to an embodiment of the present invention.

Referring to FIGS. 5 and 6, according to an embodiment of the present invention, a plurality of RRHs 121 and 122 may be mounted adjacent to each other as a single body on the rear surface of the antenna housing 110. According to an embodiment of the present invention, the RRHs 121 and 122 may include the first RRH 121, the second RRH 122, and the third RRHs (not shown), and among them, at least two or more RRHs (e.g., the first RRH 121 and the second RRH 122 in the instant embodiment for description purposes) may be mounted as a single body on the rear surface of the antenna housing 110.

Although the first RRH 121 and the second RRH 122 detachably provided as a single body in the antenna housing 110 are described below, since the first RRH 121 and the second RRH 122 have similar configurations and shapes except for their positions mounted, a description of the configuration of one RRH may apply to the other RRH, and thus, differences in the position mounted are described below.

The first RRH 121 (whose description also applies to the second RRH 122) may slide along guiding brackets 131, 132, and 133 (which are described below) positioned at a lower side of the rear surface of the antenna housing 110, having a space for mounting the first RRH 121, and provided to attach or detach the first RRH 121, and the first RRH 121 may be provided as a single body on the rear surface of the antenna housing 110. Although mentioned above, a surface (hereinafter, a "front surface") of the first RRH 121 where the first RRH 121 faces the antenna housing 110 has the first connector terminal 151 protruding therefrom and connecting with the first connector 111. The first connector 111 and the first connector terminal 151 face each other, and they respectively protrude from the rear surface of the antenna housing 110 and the first RRH 121. Further, the first connector 111 and the first connector terminal 151 are protruded not to cause interference between the rear surface of the antenna housing 110 and the front surface of the first RRH 121 when the first RRH 121 slides while spacing itself apart from the rear surface of the antenna housing 110 at a predetermined interval.

A first heat-dissipation fin member 121*c* may be provided on the surface of the first RRH 121 to effectively dissipate heat generated from internal components of the first RRH 121. According to an embodiment of the present invention, the first heat-dissipation fin member 121*c* may be positioned on the front surface of the first RRH 121 and the rear surface of the second RRH 122. However, the position of the first heat-dissipation fin member 121*c* is not limited thereto. For example, its position may be changed or altered as long as heat generated from internal components of the first RRH 121 is effectively dissipated—e.g., the first heat-dissipation fin member 121*c* may be positioned along a side edge of the first RRH 121.

As described supra, the first RRH 121 is provided as a single body in the antenna housing 110 and is detachably and separately provided in the antenna housing 110. The first RRH 121 is provided as a single body in the antenna housing 110. The first RRH 121 is provided to slide in or out of a first mount space S1 (which is described below) of the guiding brackets 131, 132, and 133 to be attached or detached from the antenna housing 110. The first RRH 121 is a component provided to be supported on the rear surface of the antenna housing 110 through the guiding brackets 131, 132, and 133 while left in the first mount spaces S1.

The guiding parts described below may be provided on the top and bottom of the first RRH 121 of the surrounding edge of the first RRH 121. In particular, according to an embodiment of the present invention, the guiding parts provided on the top and bottom of the first RRH 121 are described as provided as first sliding members among the guiding parts, for example. Specifically, the first sliding members may be first sliding protrusions 121*b* projecting from the top and bottom of the first RRH 121. Thus, the first sliding protrusions 121*b* may be inserted into the first guiding members among the guiding parts described below (where, the guiding members are formed as guiding rails) and slide along the first guiding members to attach or detach on the guiding brackets 131, 132, and 133 and to be supported in the first mount space S1. The guiding parts are described below in detail.

The first RRH 121 may be provided with a first handle 121*a* for comfortable attaching or detaching or user convenience. In particular, since the first RRH 121 is configured to slide or attach/detach in a vertical direction of the gravity direction (which refers to a direction perpendicular to the protruding direction of the first connector 111), i.e., through a side surface of the guiding brackets 131, 132, and 133, in the instant embodiment, the first handle 121*a* may be placed on the side surface of the first RRH 121.

A first photoelectric composite cable terminal 121*d*, e.g., a hybrid connector terminal, may be provided on the rear surface of the first RRH 121. That is, the first photoelectric composite connector terminal 121*d* may be provided to allow for a connection of an external photoelectric composite cable (hereinafter, a "first cable 171") having a power source terminal and an optical terminal provided in a single cable. Likewise, a first photoelectric composite connector terminal 122*d*, e.g., a hybrid connector terminal, may be provided on the rear surface of the second RRH 122. Similar to the first RRH 121 described above, the first photoelectric composite connector terminal 122*d* may be provided to allow for a connection of an external photoelectric composite cable (hereinafter, a "second cable 172") having a power source terminal and an optical terminal provided in a single cable.

Figure 7:
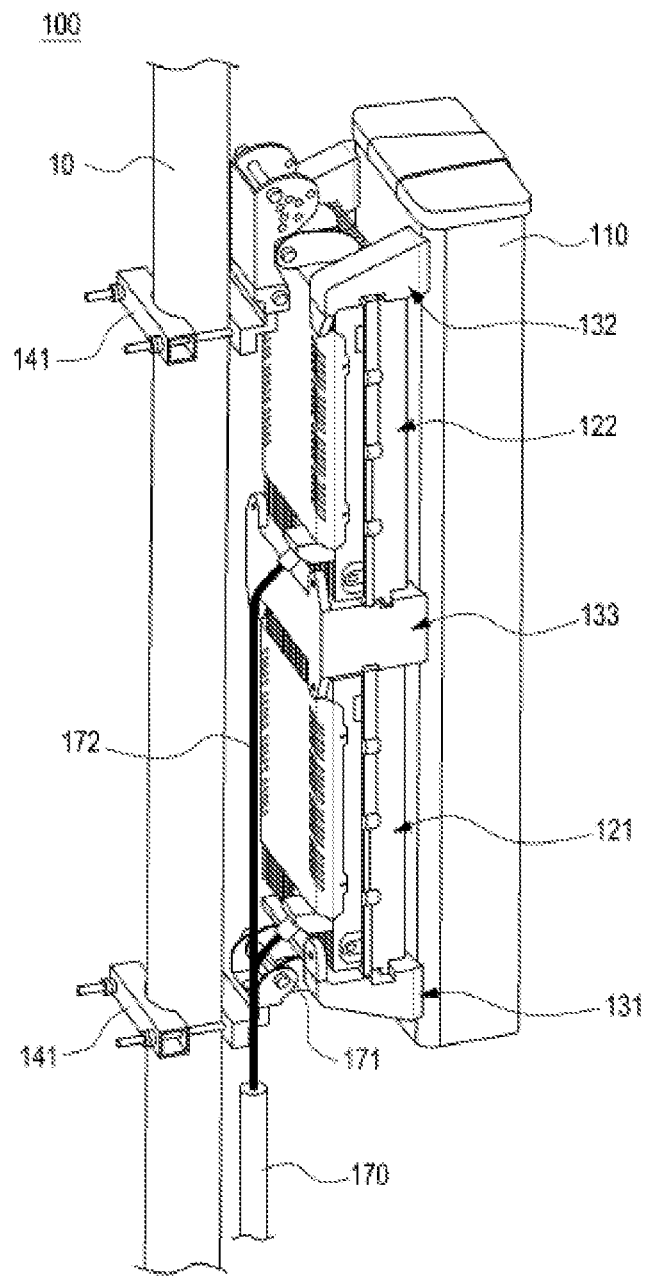
FIG. 7 is a view illustrating a multi-band antenna apparatus as viewed in a different direction, wherein an external cable is connected with a first RRH and a second RRH, according to an embodiment of the present invention.

FIG. 7 is a view illustrating a multi-band antenna apparatus as viewed in a different direction, wherein an external cable is connected with a first RRH and a second RRH, according to an embodiment of the present invention.

Referring to FIG. 7, according to an embodiment of the present invention, the external cable 170 may have both the first cable 171 and the second cable 172 in a single cable body 133*a*. The first cable 171 and the second cable 172 in the single body 133*a* may be branched near the first RRH 121. Thus, the first cable 171 is electrically connected with the first photoelectric composite connector terminal 121*d* provided on the rear surface of the first RRH 121, and the second cable 172 may be electrically connected with the first photoelectric composite connector terminal 122*d* provided on the rear surface of the second RRH 122.

According to an embodiment of the present invention, as mentioned above, the second RRH 122 is similar in structure and shape to the first RRH 121 (refer to FIGS. 5 and 6). However, the first RRH 121 is provided at a lower side on the rear surface of the antenna housing 110, and the second RRH 122 is mounted at an upper side above the first RRH 121 on the rear surface of the antenna housing 110. Accordingly, as viewed from the rear surface of the antenna housing 110, the second RRH 122 and the first RRH 121 under the second RRH 122 may be mounted neighboring each other along the gravity direction.

Specifically, the second RRH 122 (whose description applies likewise to the first RRH 121) is positioned above the first RRH 121 at an upper side on the rear surface of the antenna housing 110. Accordingly, the second RRH 122 may be slid along the guiding brackets 131, 132, and 133 (described below) provided to attach or detach the second RRH 122 in the space for mounting the second RRH 122 positioned above the space for mounting the first RRH 121 to be provided as a single body on the rear surface of the antenna housing 110. Although mentioned above, a surface (hereinafter, a "front surface") of the second RRH 122 where the second RRH 122 faces the antenna housing 110 has the second connector terminal 152 protruding therefrom and connecting with the second connector 112. The second connector 112 and the second connector terminal 152 face each other, and they respectively protrude from the rear surface of the antenna housing 110 and the second RRH 122. Further, the second connector 112 and the second connector terminal 152 are protruded not to cause interference between the rear surface of the antenna housing 110 and the front surface of the second RRH 122 when the second RRH 122 slides while spacing itself apart form the rear surface of the antenna housing 110 at a predetermined interval.

A second heat-dissipation fin member 122*c* may be provided on the surface of the second RRH 122 to effectively dissipate heat generated from internal components of the second RRH 122. According to an embodiment of the present invention, the second heat-dissipation fin member 122*c* may be positioned on the front surface of the first RRH 121 and the rear surface of the second RRH 122. However, the position of the second heat-dissipation fin member 122*c* is not limited thereto. For example, its position may be changed or altered as long as heat generated from internal components of the second RRH 122 is effectively dissipated—e.g., the second heat-dissipation fin member 122c may be positioned along a side edge of the second RRH 122.

The guiding parts described below may be provided on the top and bottom of the second RRH 122 of the surrounding edge of the second RRH 122. In particular, according to an embodiment of the present invention, the guiding parts provided on the top and bottom of the second RRH 122 are described as provided as second sliding members among the guiding parts, for example. Specifically, the second sliding members may be second sliding protrusions 122b projecting from the top and bottom of the second RRH 122. Thus, the second sliding protrusions 122b may be inserted into the second guiding members among the guiding parts described below (where, the guiding members are formed as guiding rails) and slide along the second guiding members to attach or detach on the guiding brackets 131, 132, and 133 and to be supported in the second mount space S2. The guiding parts are described below in detail.

The second RRH 122 is provided as a single body in the antenna housing 110 and is detachably and separately provided in the antenna housing 110. The second RRH 122 is provided as a single body in the antenna housing 110 and is slid in or out of the second mount space S2 (which is described below) of the guiding brackets 131, 132, and 133 to attach or detach at an upper side (as compared with the space for mounting the first RRH 121) of the antenna housing 110. The second RRH 122 may be provided to be supported on the rear surface of the antenna housing 110 through the guiding brackets 131, 132, and 133 while left in the second mount spaces S2. Specifically, the second RRH 122 may be provided to be supported at an upper side of the first RRH 121 detachably mounted on the rear surface of the antenna. Further, the second RRH 122 may have a second handle 122a for easier attaching or detaching and user convenience. The second handle 122a may be installed on the side surface of the second RRH 122 considering the sliding direction of the second RRH 122 for attaching and detaching as the first handle 121a is.

Figure 8:
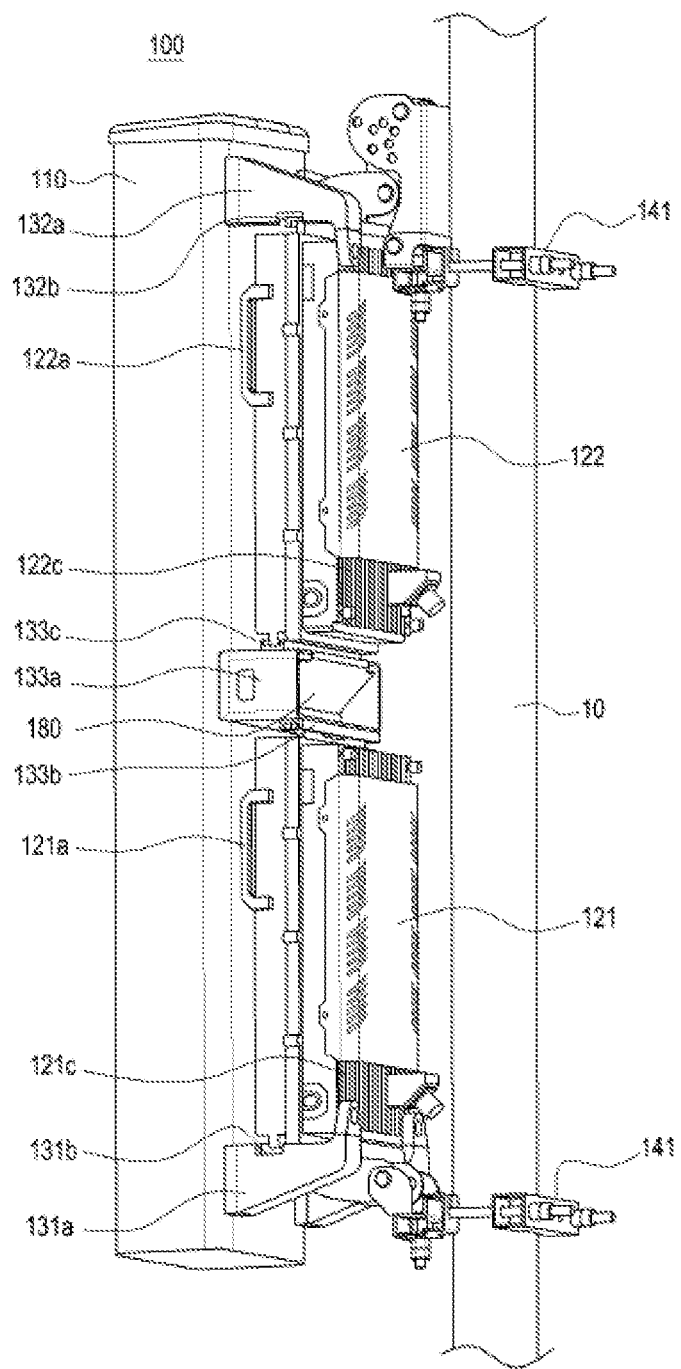
FIG. 8 is a perspective view illustrating a multi-band antenna apparatus according to an embodiment of the present invention.

FIG. 8 is a perspective view illustrating a multi-band antenna apparatus according to an embodiment of the present invention.

Referring to FIG. 8 (along with FIG. 1), according to an embodiment of the present invention, the multi-band antenna apparatus 100 may have brackets 131, 132, 133, and 141 fastening the antenna housing 110 to, e.g., the outer wall 10 and provided to attach or detach and support the first RRH 121 and the second RRH 122 as a single body.

According to an embodiment of the present invention, the brackets 131, 132, 133, and 141 may include brackets 141 for fastening and brackets 131, 132, and 133 for guiding.

The fastening brackets 141 are provided as a first fastening bracket 141 and a second fastening bracket 141 that are coupled at an upper and lower side of the rear surface of the antenna housing 110 and fasten to the outer wall 10, and they are components for fastening the antenna housing 110 to the outer wall 10. According to an embodiment of the present invention, described is an example in which the fastening brackets 141 are coupled through connection with the guiding brackets 131, 132, and 133 described below and coupled to the rear surface of the antenna housing 110. However, as described below, in case the size of RRHs mounted is small as compared with the size of the antenna housing 110, the fastening brackets 141 may be provided at an upper and lower side of the antenna housing 110 and fastened to, e.g., the outer wall 10, and the guiding brackets 131, 132, and 133 may be provided between the fastening brackets 141. As such, various changes or modifications may be made to the position of mounting the fastening brackets 141 and the guiding brackets 131, 132, and 133.

Figure 9:
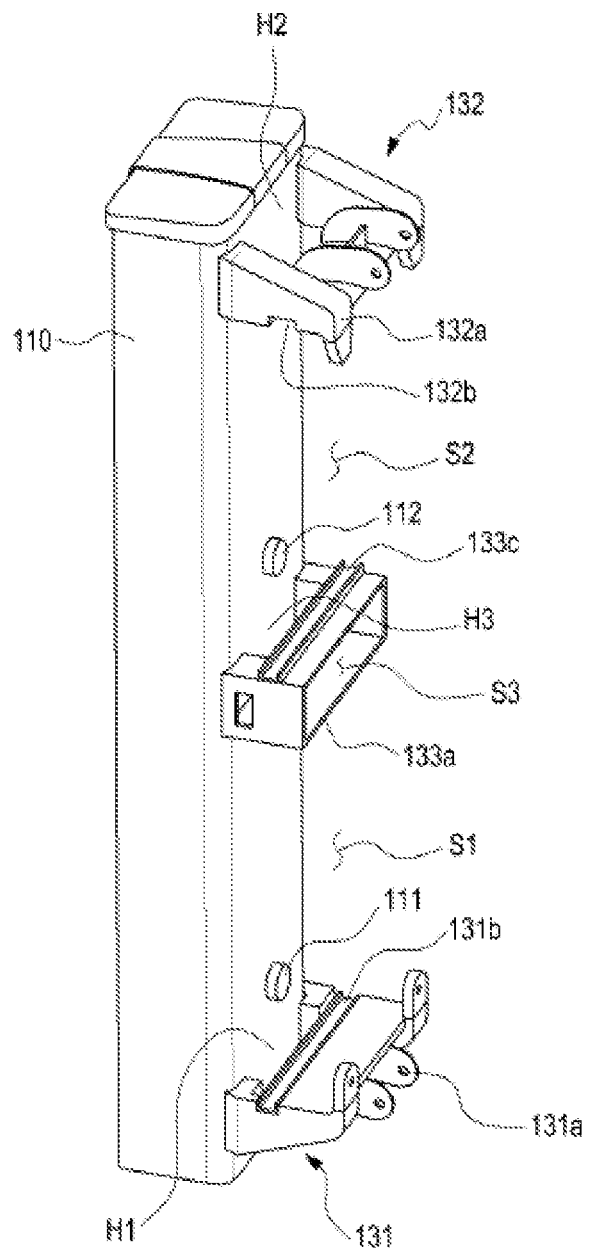
FIG. 9 is a view illustrating a bracket for guiding provided in a rear surface of an antenna housing in a multi-band antenna apparatus according to an embodiment of the present invention.

FIG. 9 is a view illustrating a bracket for guiding provided in a rear surface of an antenna housing in a multi-band antenna apparatus according to an embodiment of the present invention.

Referring to FIG. 9 (along with FIGS. 1 and 2), the guiding brackets 131, 132, and 133 are provided on the rear surface of the antenna housing 110 to attach, detach, and support the first RRH 121 and the second RRH 122 on the rear surface of the antenna housing 110. Further, the guiding brackets 131, 132, and 133 form a first mount space S1 and a second mount space S2 allowing the first RRH 121 and the second RRH 122 to be mounted on the rear surface of the antenna housing 110. The guiding brackets 131, 132, and 133 may include a first bracket 131 and a second bracket 132 provided at an upper and lower side of the antenna housing 110 and a third bracket 133 positioned between the first bracket 131 and the second bracket 132.

The mounted position and overall structure of the first bracket 131, second bracket 132, and third bracket 133 are first described. The first mount space S1 for mounting the first RRH 121 is formed between the first bracket 131 and the third bracket 133, and the lower and upper portions of the first RRH 121 are provided to be seated, attached, or detached on the first bracket 131 and the third bracket 133, respectively. As described below, a pair of first guiding members may be provided on opposite surfaces of the first bracket 131 and the third bracket 133.

The second mount space S2 is formed between the second bracket 132 and the third bracket 133 to mount the second RRH 122, and the upper and lower portions of the second RRH 122 are provided to be seated, attached, or detached on the second bracket 132 and the third bracket 133. As described below, a pair of second guiding members may be provided on opposite surfaces of the second bracket 132 and the third bracket 133.

Figure 10:
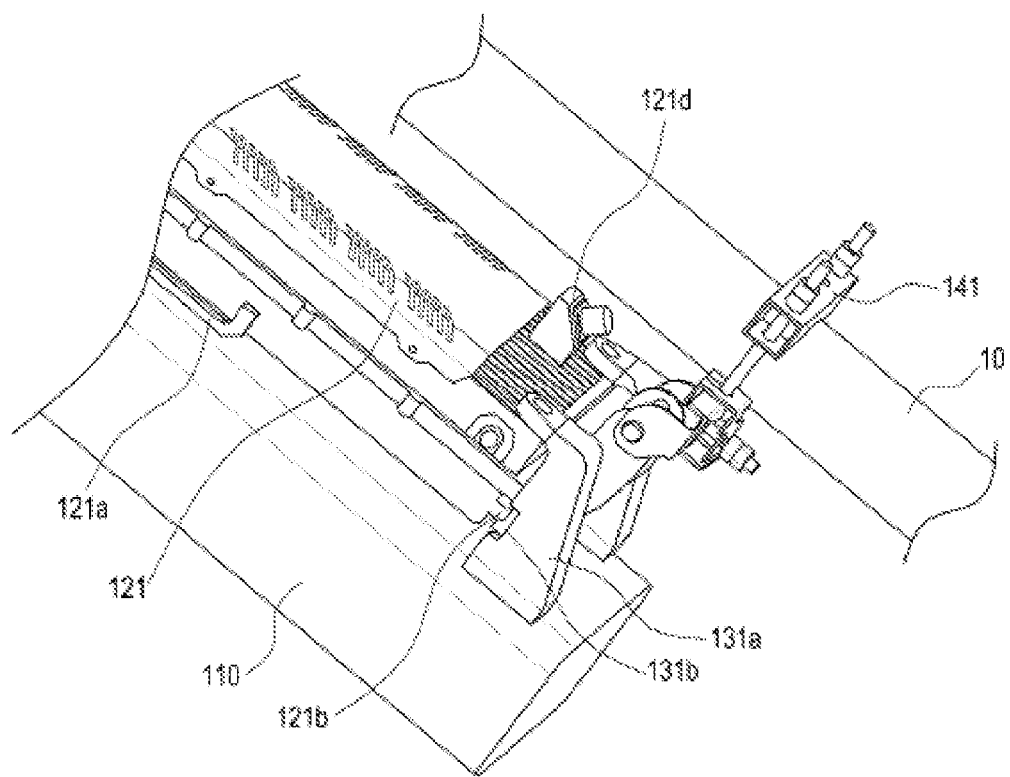
FIG. 10 is an expanded view illustrating a first bracket with a cover removed in a multi-band antenna apparatus according to an embodiment of the present invention.

FIG. 10 is an expanded view illustrating a first bracket with a cover removed in a multi-band antenna apparatus according to an embodiment of the present invention.

Referring to FIG. 10, the first bracket is specifically a component that is positioned at the lowermost side of the antenna housing among the three brackets. The first bracket 131 may include a first supporting plate 131a and a first lower guiding rail 131b of a pair of first guiding members. The first supporting plate 131a is a component that is provided to support a lower portion of the first RRH 121 and mounted in a direction perpendicular to the gravity on the rear surface of the antenna housing 110. The first lower guiding rail 131b shaped as the letter "U" is provided on an upper surface of the first supporting plate 131a. The first lower guiding rail 131b is provided as a single body in the first supporting plate 131a. Here, the term "single body" denotes components with two or more functions being constituted of one material without, e.g., a combined surface or components of the same or two different materials being combined together into one.

Accordingly, the first supporting plate 131a and the U-shaped first lower guiding rail 131b may form their shape through one material, or the same or two different materials may be combined together into a single component.

According to an embodiment of the present invention, described is an example in which the first bracket 131 is positioned at a lowermost side of the antenna housing 110 and is connected with the fixing bracket 141 positioned at a lower side to support the antenna housing 110 to the outer wall 10. However, as mentioned above, various changes or modifications may be made thereto depending on the size of the antenna housing 110—for example, the first bracket 131 may be positioned separately from the underneath fixing bracket 141.

Further, a through hole H1 is formed to be spaced apart at a predetermined interval from the antenna housing 110 in the first bracket 131, specifically between both ends of the first supporting plate 131a. This is provided to allow external air to be introduced into a lower portion of the first RRH 121 to be able to generate heat. According to an embodiment of the present invention, the first bracket 131 may further include a cover 131c covering both side surfaces of the first bracket 131, e.g., in an aesthetic point of view.

Figure 11:
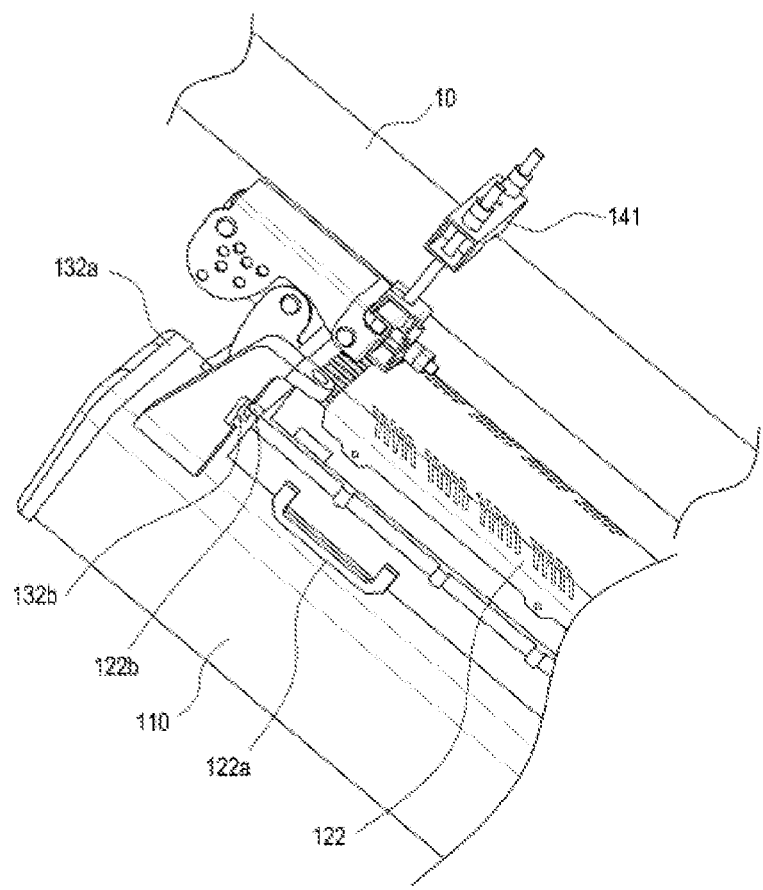
FIG. 11 is an expanded view illustrating a second bracket in a multi-band antenna apparatus according to an embodiment of the present invention.

FIG. 11 is an expanded view illustrating a second bracket in a multi-band antenna apparatus according to an embodiment of the present invention.

Referring to FIG. 11, the second bracket 132 is a component positioned at an uppermost side of the antenna housing 110 among the three brackets 131, 132, 133, and 141. The second bracket 132 may include a second supporting plate 132a and a second upper guiding rail 132b of a pair of second guiding members. The second supporting plate 132a is a component that is provided to support an upper portion of the second RRH 122 and mounted in a direction perpendicular to the gravity on the upper surface of the antenna housing 110. The second upper guiding rail 132b shaped as the letter "U" is provided on a lower surface of the second supporting plate 132a. The second upper guiding rail 132b is provided as a single body in the second supporting plate 132a. Here, the term "single body" has been described above, and its description applies here. The second supporting plate 132a and the U-shaped second upper guiding rail 132b may form their shape through one material, or the same or two different materials may be combined together into a single component.

According to an embodiment of the present invention, described is an example in which the second bracket 132 is positioned at an uppermost side of the antenna housing 110 and is connected with the fixing bracket 141 positioned at an upper side to support the antenna housing 110 to the outer wall 10. However, as mentioned above, various changes or modifications may be made thereto depending on the size of the antenna housing 110—for example, the second bracket 132 may be positioned separately from the underneath fixing bracket 141.

Further, a through hole H2 is formed to be spaced apart at a predetermined interval from the antenna housing 110 in the second bracket 132, specifically between both ends of the second supporting plate 132a. This is provided to discharge air introduced through a through hole H3 formed in an upper surface of the third bracket 133 described below and heated up while passing through the second RRH 122 to an upper portion. According to an embodiment of the present invention, the second bracket 132 may further include a cover 132c covering both side surfaces of the first bracket 131, e.g., in an aesthetic point of view.

Figure 12:
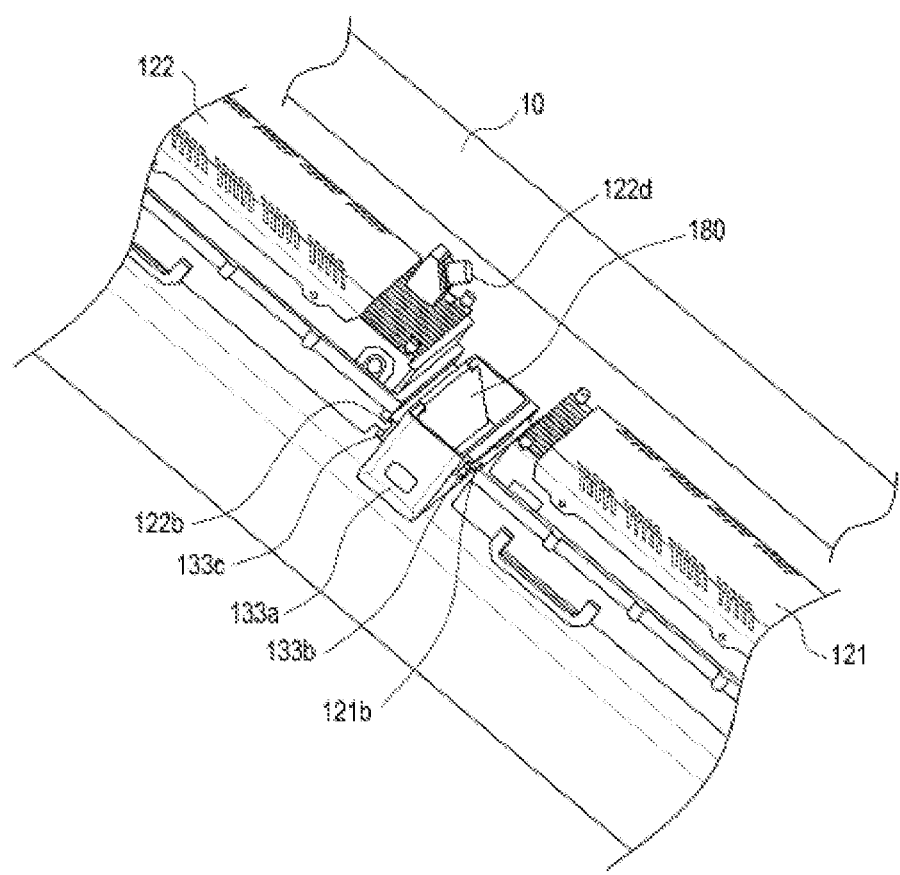
FIG. 12 is an expanded view illustrating a third bracket in a multi-band antenna apparatus according to an embodiment of the present invention.
Figure 13:
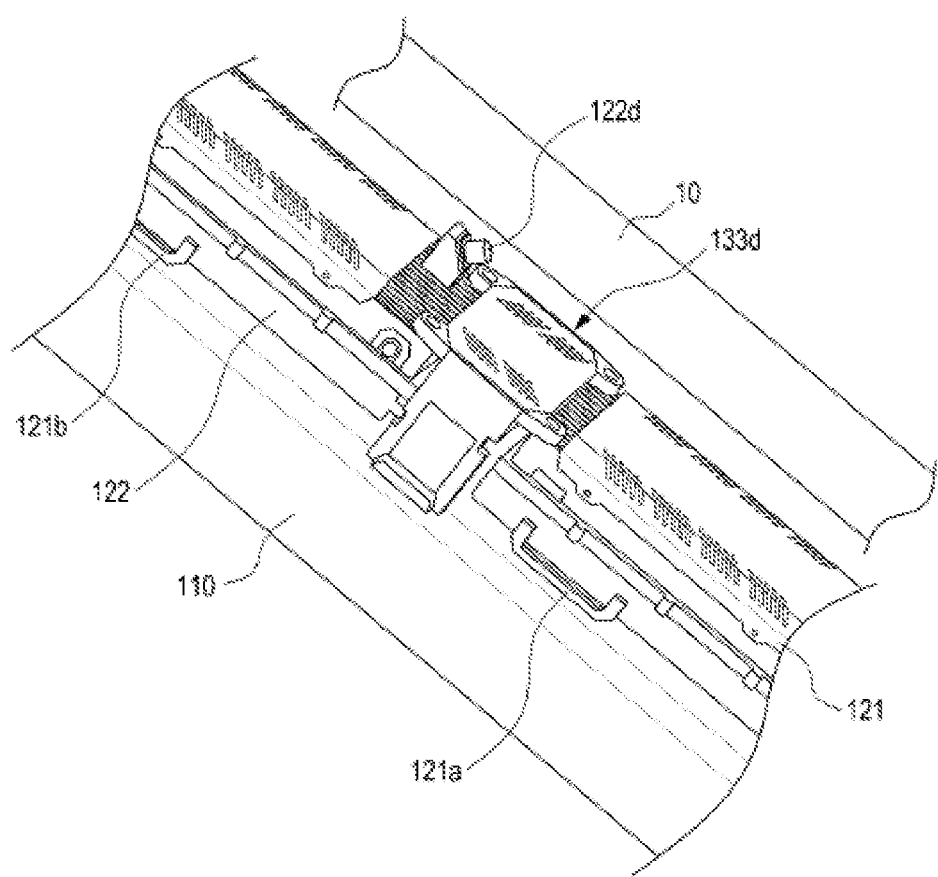
FIG. 13 is an expanded view illustrating a third bracket having a cover unit mounted thereon in a multi-band antenna apparatus according to an embodiment of the present invention.

FIG. 12 is an expanded view illustrating a third bracket in a multi-band antenna apparatus according to an embodiment of the present invention. FIG. 13 is an expanded view illustrating a third bracket having a cover unit mounted thereon in a multi-band antenna apparatus according to an embodiment of the present invention.

Referring to FIGS. 12 and 13, the third bracket 133 is provided to support a lower portion of the first RRH 121 and an upper portion of the second RRH 122 while forming a space where an upper portion of the air outlet 12 is spaced apart from a lower portion of the second RRH 122. Specifically, the third bracket 133 may include a body 133a forming an empty space S3, a first upper guiding rail 133b positioned in a lower surface of the body 133a, and a second lower guiding rail 133c positioned in an upper surface of the body 133a.

According to an embodiment of the present invention, the upper and lower surfaces of the body 133a form a through hole H3 allowing for penetration along with the empty space S3 except for the surface where the first upper guiding rail 133b and the second lower guiding rail 133c may be mounted. Specifically, the through hole H3 formed in the lower surface of the body 133a is provided to allow heat generated from the first RRH 121 to be dissipated through the upper portion of the first RRH 121. Further, the through hole H3 formed in the upper surface of the body 133a is provided allowing external air to be introduced into the second RRH 122 to generate heat.

According to an embodiment of the present invention, described is an example in which the third bracket 133 further includes a cover 133d to cover, e.g., the empty space S3. The cover 133d is provided for better outer look, and whether the cover 133d is provided to the third bracket 133 may be varied or altered.

A shielding plate 180 (also referred to as a baffle) is provided in the empty space S3 of the body 133a. The shielding plate 180 is provided to be inclined from an upper outer edge of the body 133a to a lower internal edge thereof. The shielding plate 180 is provided to prevent high-temperature air discharged from the upper side of the first RRH 121 from flowing in the second RRH 122 and to allow external air to flow in the lower side of the second RRH 122. In particular, it is provided to present maximized heat-dissipation efficiency when the RRHs 121 and 122 are mounted to neighbor each other in the rear surface of the antenna housing 110 by preventing high-temperature air discharged from the upper side of the first RRH 121 from flowing in the second RRH 122. Further, as the rear surfaces of the first RRH 121 and the second RRH 122 are exposed externally, and first heat dissipation fin members 121c are provided on the exposed rear surfaces to be externally exposed, the plurality of RRHs mounted as a single body in the antenna housing 110 may enjoy increased heat-dissipation efficiency.

According to an embodiment of the present invention, the guiding brackets 131, 132, and 133 have guiding parts. According to the present invention, the guiding parts may include sliding members and guiding members (refer to FIGS. 10 to 13).

The sliding members may include a first sliding member and a second sliding member.

The first sliding member is provided to protrude from each of the top and bottom of the first RRH 121 and is formed of a first sliding protrusion 121b. The first sliding protrusion 121b is seated on the above-described first guiding members, specifically, the first upper guiding rail 133b and the first lower guiding rail 131b and is provided to be attached or detached from the first mount space S1 while sliding along the first upper guiding rail 133b and the first lower guiding rail 131b.

The second sliding member is provided to protrude from each of the top and bottom of the second RRH 122 and is formed of a second sliding protrusion 122b. The second sliding protrusion 122b is seated on the above-described second guiding members, specifically, the second upper guiding rail 132b and the second lower guiding rail 133c and is provided to be attached or detached from the second mount space S2 while sliding along the second upper guiding rail 132*b* and the second lower guiding rail 133*c*.

The guiding members have been described above together with the first bracket 131, the second bracket 132, and the third bracket 133. Briefly, according to an embodiment of the present invention, the guiding members may include first guiding members and second guiding members.

The first guiding members are provided to face each other with the first mount space S1 positioned therebetween, seat the first RRH 121 thereon, and guide the first RRH 121 to slide in the first mount space S1. The first guiding members may include a first lower guiding rail 131*b* provided in an upper surface of the first bracket 131 and a first upper guiding rail 133*b* provided in a lower surface of the body 133*a* of the third bracket 133. The first upper guiding rail 133*b* and the first lower guiding rail 131*b* each are shaped as the letter "U" and mounted to face each other. The first sliding protrusion 121*b* is seated on each of the first upper guiding rail 133*b* and the first lower guiding rail 131*b*, and the first upper guiding rail 133*b* and the first lower guiding rail 131*b* guide a slide of the first sliding protrusion 121*b*.

The second guiding members are provided to face each other with the second mount space S2 positioned therebetween, seat the second RRH 122 thereon, and guide the first RRH 122 to slide in the second mount space S1. The second guiding members may include a second upper guiding rail 132*b* provided in a lower surface of the second bracket 132 and a second lower guiding rail 133*c* provided in an upper surface of the body 133*a* of the third bracket 133. The second upper guiding rail 132*b* and the second lower guiding rail 133*c* each are shaped as the letter "U" and mounted to face each other. The second sliding protrusion 122*b* is seated on each of the second upper guiding rail 132*b* and the second lower guiding rail 133*c*, and the second upper guiding rail 132*b* and the second lower guiding rail 133*c* guide a slide of the second sliding protrusion 122*b*.

In the multi-band antenna apparatus 100 configured as above according to an embodiment of the present invention, the first RRH 121 and the second RRH 122 may separately be detached or replaced from the antenna housing 110 with a plurality of antenna modules, with the antenna housing 110 fastened to the outer wall 10. That is, as described above, the fixing brackets 141 positioned at an upper and lower side of the antenna housing 110 are fastened to the outer wall 10. The first mount space S1 and the second mount space S2 where a plurality of compact RRHs 121 and 122 are mounted to neighbor each other in parallel along the gravity direction by the guiding brackets 131, 132, and 133 are formed between the upper fastening bracket 141 and the lower fastening bracket 141 on the rear surface of the antenna housing 110.

As the first sliding protrusions 121*b* on the upper and lower portion of the first RRH 121 are respectively seated and slid on the first upper guiding rail 133*b* and the first lower guiding rail 131*b*, the first RRH 121 is seated in the first mount space S1. By contrast, as the first handle 121*a* of the first RRH 121 seated in the first mount space S1 is pulled, the upper and lower first sliding protrusions 121*b* seated on the first upper guiding rail 133*b* and the first lower guiding rail 131*b* are slid along the first upper guiding rail 133*b* and the first lower guiding rail 131*b* and are thus escaped from the first mount space S1.

Further, the second RRH 122 may be attached or detached from the second mount space S2 separately from the first RRH 121 attached or detached. That is, as the second sliding protrusions 122*b* on the upper and lower portion of the second RRH 122 are respectively seated and slid on the second upper guiding rail 132*b* and the second lower guiding rail 133*c*, the second RRH 122 is seated in the second mount space S2. By contrast, as the second handle 122*a* of the second RRH 122 seated in the second mount space S2 is pulled, the upper and lower second sliding protrusions 122*b* seated on the second upper guiding rail 132*b* and the second lower guiding rail 133*c* are slid along the second upper guiding rail 132*b* and the second lower guiding rail 133*c* and are thus escaped from the second mount space S2.

As mentioned above, since the second RRH 122 may be attached or detached from the second mount space S2 separately from the first RRH 121 attached or detached, only one of the first RRH 121 or the second RRH 122 may be replaced, and the antenna modules other than the antenna module connected with the replaced RRH may be driven so that services corresponding to the antenna modules other than the one connected with the replaced RRH may remain in availability.

Further, as the shielding plate is placed between neighboring RRHs, heat-dissipation efficiency between the RRHs may be maintained or enhanced.

In the above-described embodiment, the antenna apparatus has a 4 ft size as an example. However, the present invention is not limited thereto.

For example, as shown in FIGS. 14 and 15, the antenna housing may be sized to be 7 ft or 9 ft, and various changes or modifications may be made to the size.

As described above, FIG. 14 is a view illustrating an example in which an antenna housing is sized to be 7 ft in a multi-band antenna apparatus according to an embodiment of the present invention. FIG. 15 is a view illustrating an example in which an antenna housing is sized to be 9 ft in a multi-band antenna apparatus according to an embodiment of the present invention.

Referring to FIGS. 14 and 15, according to an embodiment of the present invention, examples in which two RRHs are mounted depending on the size of the antenna housing 110 and embodiments of fastening structures may be shown, and their description is the same as what has been described above, and the above description applies thereto.

According to an embodiment of the present invention, the multi-band antenna apparatus described above benefits installation of multiple antennas, e.g., 700 MHz, 850 MHz, PCS, and AWS band antennas, in one antenna housing.

Further, the RRHs respectively connected with the antennas may be provided at an outside of the antenna housing. In particular, among the RRHs, RRHs for 3G or 4G (e.g., RRHs connected with antennas for 700 MHz and AWS) may be mounted adjacent to the antenna housing, allowing at least two or more RRHs to be formed in the antenna housing as a single body.

Further to single-body formation of the RRHs in the antenna housing, each RRH may be detachably and separately provided in the antenna housing, enabling simple exchange of RRHs upon malfunctioning or failure.

Further, antennas except for only antennas corresponding to malfunctioning or exchanged RRHs may be normally operated, and thus, services corresponding to the normally working antennas are still in availability.

While the present invention has been shown and described with reference to exemplary embodiments thereof, it will be apparent to those of ordinary skill in the art that various changes in form and detail may be made thereto without departing from the spirit and scope of the present invention as defined by the following claims.

What is claimed is:

1. A multi-band antenna apparatus, comprising:
an antenna housing, within which antenna modules with two or more frequency bands are mounted;
fastening brackets provided at an upper and a lower sides of the antenna housing for fastening the antenna housing to an outer wall;
guiding brackets provided on a rear surface of the antenna housing, wherein the guiding brackets include guiding members;
a plurality of radio remote heads (RRHs) configured to be slidably coupled to the guiding brackets of the antenna housing along the guiding members; and
connector portions that protrude from the rear surface of the antenna housing and are movable in a direction perpendicular to the rear surface of the antenna housing for connecting the plurality of RRHs,
wherein the guiding members are configured to slidably guide the RRHs along a lateral direction parallel to the rear surface of the antenna housing into spaces between the rear surface of the antenna housing and the fastening brackets,
wherein the guiding members include a first guiding member provided between a first bracket of the guiding brackets and a third bracket of the guiding brackets for slidably guiding a first RRH of the RRHs and a second guiding member provided between a second bracket of the guiding brackets and a third bracket of the guiding brackets for slidably guiding a second RRH of the RRHs,
wherein the first guiding member includes a U-shaped first lower guiding rail provided on an upper surface of a first supporting plate of the first bracket and a reversed U-shaped first upper guiding rail provided on a lower surface of a body of the third bracket and facing the first lower guiding rail, and wherein a first mount space of the guiding bracket is defined between the first lower guiding rail and the first upper guiding rail, and
wherein the second guiding member includes a reversed U-shaped second upper guiding rail provided on a lower surface of a second supporting plate of the second bracket and a U-shaped second lower guiding rail provided on an upper surface of the body of the third bracket and facing the second upper guiding rail, and wherein a second mount space of the guiding bracket is defined between the second upper guiding rail and the second lower guiding rail.

2. The multi-band antenna apparatus of claim 1, wherein each of the RRHs includes sliding members provided along surrounding edges of the RRHs, configured to be slidably inserted into the guiding members of the guiding brackets.

3. The multi-band antenna apparatus of claim 2, wherein the RRHs include the first radio remote head (RRH) mounted at a lower portion of the rear surface of the antenna housing and electrically connected with a first antenna module within the antenna housing and the second RRH disposed adjacent to the first RRH at an upper portion of the rear surface of the antenna housing and electrically connected with a second antenna module within the antenna housing.

4. The multi-band antenna apparatus of claim 3, wherein the guiding brackets include the first bracket provided on a lower surface of the antenna housing, the second bracket provided on an upper surface of the antenna housing, and the third bracket provided between the first bracket and the second bracket in the antenna housing, wherein the first mount space for mounting the first RRH is provided between the first bracket and the third bracket, and the second mount space for mounting the second RRH is provided between the second bracket and the third bracket.

5. The multi-band antenna apparatus of claim 4, wherein the first bracket includes the first supporting plate mounted in a direction perpendicular to a gravity direction, wherein the second bracket includes the second supporting plate mounted in the direction perpendicular to the gravity direction, wherein the third bracket includes the body, and wherein the first guiding member is provided between the first supporting plate and the body, and the second guiding member is provided between the second supporting plate and the body.

6. The multi-band antenna apparatus of claim 5, wherein the sliding members include first sliding members protruding from an upper and a lower surfaces of the first RRH, seated, supported, and slid on the first upper guiding rail and the first lower guiding rail, respectively and second sliding members protruding from an upper and a lower surfaces of the second RRH, seated, supported, and slid on the second upper guiding rail and the second lower guiding rail, respectively.

7. The multi-band antenna apparatus of claim 5, further comprising a shielding plate formed to be inclined inside the body and preventing high-temperature air discharged from an upper side of the first RRH from being introduced into a lower side of the second RRH.

8. The multi-band antenna apparatus of claim 3, wherein the connector portions include:
a first connector protruding at a lower portion on a rear surface of a first housing and electrically connecting the first RRH with the first antenna module; and
a second connector protruding at an upper portion on a rear surface of a second housing above the first connector and electrically connecting the second RRH with the second antenna module.

9. The multi-band antenna apparatus of claim 8, wherein a first connector terminal is provided on a surface of the first RRH to electrically connect with the first connector, and a second connector terminal is provided on a surface of the second RRH to electrically connect with the second connector.

10. The multi-band antenna apparatus of claim 3, wherein a first heat-dissipation fin member is provided on an edge of a surface of the first RRH, and a second heat-dissipation fin member is provided on an edge of a surface of the second RRH.

* * * * *